United States Patent [19]

Sasaki

[11] Patent Number: 5,467,375
[45] Date of Patent: Nov. 14, 1995

[54] GAS INJECTION SYSTEM OF NUCLEAR POWER PLANT AND GAS INJECTION METHOD THEREFOR

[75] Inventor: Noriyuki Sasaki, Yokosuka, Japan

[73] Assignee: Kabushiki Kaisha Toshiba, Kawasaki, Japan

[21] Appl. No.: 303,813

[22] Filed: Sep. 9, 1994

[30] Foreign Application Priority Data

Sep. 9, 1993 [JP] Japan .................... 5-224666

[51] Int. Cl.$^6$ .................................. G21C 19/317
[52] U.S. Cl. .................. 376/300; 376/246; 376/256
[58] Field of Search ................... 376/300, 301, 376/246, 256; 423/580.1, 580.2

[56] References Cited

U.S. PATENT DOCUMENTS

| | | | |
|---|---|---|---|
| 3,658,996 | 4/1972 | Frumerman et al. | 376/300 |
| 3,791,923 | 2/1974 | Bhan | 376/300 |
| 4,228,132 | 10/1980 | Weems et al. | 376/300 |

FOREIGN PATENT DOCUMENTS

| | | | |
|---|---|---|---|
| 6-109893 | 4/1994 | Japan | 376/300 |

Primary Examiner—Daniel D. Wasil

Attorney, Agent, or Firm—Oblon, Spivak, McClelland, Maier & Neustadt

[57] ABSTRACT

A gas injection system of a nuclear power plant including a reactor and a gaseous waste disposal system, comprises a hydrogen injection unit for injecting hydrogen into a reactor of a nuclear power plant, an oxygen injection unit for injecting oxygen into a gaseous waste disposal system in which the oxygen is recombined with the hydrogen passed by way of the reactor, a densitometer for measuring a balance of concentration between the hydrogen and the oxygen in the gaseous waste disposal system, a flowmeter for measuring a flow rate of an exhaust gas of the gaseous waste disposal system, and a controlling unit for controlling the quantities of the hydrogen gas and the oxygen gas. According to the operation of the controlling unit, the injection quantities of the hydrogen and the oxygen from the hydrogen injection unit and the oxygen injection unit are controlled in accordance with the results of the concentration balance measurement and the flow rate measurement, a lag time between a time when the oxygen and the hydrogen are injected and the time when the oxygen and the hydrogen reach the gaseous waste disposal system is stored, respectively, and an injection timing from the hydrogen injection and the oxygen injection is controlled in response to the lag time.

11 Claims, 2 Drawing Sheets

GAS INJECTION SYSTEM OF NUCLEAR POWER PLANT AND GAS INJECTION METHOD THEREFOR

BACKGROUND OF THE INVENTION

1. Field of the Invention

The present invention relates to a gas injection system of a nuclear power plant for injecting hydrogen and oxygen in a nuclear power plant and also relates to a gas injection method therefor.

2. Description of the Related Prior Art

Generally, there has been known a technique of reducing an oxygen concentration of water to be brought into contact with a stainless steel as a technique for controlling a stress corrosion cracking of the stainless steel. In a nuclear power plant, fixed quantities of hydrogen and oxygen are generated in a reactor by radiolysis of water. By the generation of hydrogen and oxygen in the reactor, a dissolved oxygen concentration of the reactor water is determined based on the temperature-pressure conditions, and the dissolved oxygen concentration is usually about 100–200 ppb. The radiolysis of water is controlled and the oxygen concentration in the reactor is lowered by the injection of the hydrogen into the reactor water.

In the reactor, before the injection of the hydrogen, the hydrogen and oxygen in a main steam are sent in a volume ratio of 2:1, and after passing through a main condenser, they are recombined by a recombiner of a gaseous water disposal system and then become water to be recovered.

However, in case of injecting the hydrogen into the reactor, the oxygen is reduced due to the reduction of the quantity of the radiolysis of water in the reactor, and the hydrogen is injected from the outside, so that the volume ratios of the hydrogen and the oxygen in the main steam is not 2:1 and the quantity of the hydrogen extremely exceeds. Because of this reason, since an excess of the hydrogen is flowed into the gaseous waste disposal system, it is necessary to inject the oxygen so as to be recombined with the hydrogen.

However, in such a case as described above, a problem of quantity of gases to be injected is caused. That is, the quantity of the hydrogen to be injected varies in accordance with an output power of the nuclear power plant and is usually in the quantity of about 30–120 $Nm^3/Hr$. Almost all quantity of the injected hydrogen is flowed into the gaseous waste disposal system.

A flow rate of the exhaust gas which can be treated by the gaseous waste disposal system is about 20–40 $Nm^3/Hr$, which corresponds to the quantity for treating an air leaked from the main condenser. When an excess of hydrogen is flowed into the air, some portion thereof is recombined with the oxygen in the air, but the most portion thereof is flowed into the gaseous waste disposal system. The flow rate of the exhaust gas of the gaseous waste disposal system becomes 40–130 $Nm^3/Hr$, exceeding the allowable flow rate.

Therefore, when the oxygen for the recombination with the hydrogen is injected into the gaseous waste disposal system, the hydrogen is recombined with the oxygen, and only the air leaked from the main condenser is treated in the gaseous waste disposal system.

Since the quantities of the hydrogen and the oxygen to be injected are larger than the allowable flow rate in the gaseous waste disposal system, it is an important matter to maintain a balance of the quantities of the hydrogen and the oxygen at an inlet of the gaseous waste disposal system.

Furthermore, since the hydrogen injected to a water system reaches the gaseous waste disposal system by way of the reactor, the main steam pipe and the main condenser of the nuclear power plant, there causes a time lag that elapses between the injection of the hydrogen and the reaching thereof to the gaseous waste disposal system, and it is difficult to define an injection timing of the oxygen to be injected into the gaseous waste disposal system, thus providing a problem.

Still furthermore, the hydrogen becomes an explosion area when it exceeds 4% in a volume ratio in a mixing condition with another gases. Accordingly, it is also important to avoid the condition where the hydrogen exceeds in its quantity.

SUMMARY OF THE INVENTION

An object of the present invention is to substantially eliminate defects or drawbacks encountered in the prior art described above and to provide a gas injection system of a nuclear power plant capable of controlling the quantity of the hydrogen so as not to exceed in the quantity to be injected and ensuring that the hydrogen and the oxygen reach the gaseous waste disposal system at the same time, and also provide a gas injection method therefor.

This and other objects can be achieved according to the present invention by providing, in one aspect, a gas injection system of a nuclear power plant including a reactor and a gaseous waste disposal system, comprising:

a hydrogen injection means for injecting hydrogen into a reactor of a nuclear power plant;

an oxygen injection means for injecting oxygen into a gaseous waste disposal system in which the oxygen is recombined with the hydrogen passed by way of the reactor;

a densitometer for measuring a balance of concentration between the hydrogen and the oxygen in the gaseous waste disposal system;

a flowmeter for measuring a flow rate of an exhaust gas of the gaseous waste disposal system; and a control means for controlling injection quantities of the hydrogen and the oxygen from the hydrogen injection means and the oxygen injection means in accordance with the measurement results of the densitometer and the flowmeter, for storing a lag time between a time when the oxygen and the hydrogen are injected and a time when the oxygen and the hydrogen reach the gaseous waste disposal system, respectively, and for controlling injection timings from the hydrogen injection means and the oxygen injection means in response to the lag time.

In another aspect, there is provided a gas injection method for a nuclear power plant including a reactor and a gaseous waste disposal system, comprising the steps of:

injecting hydrogen into a reactor of a nuclear power plant;

injecting oxygen into a gaseous waste disposal system in which the oxygen is recombined with the hydrogen passed by way of the reactor;

measuring a balance of concentration between the hydrogen and the oxygen in the gaseous waste disposal system;

measuring a flow rate of an exhaust gas of the gaseous waste disposal system;

controlling injection quantities of the hydrogen and the oxygen in accordance with the results of the concentration balance measurement and the flow rate measurement;

storing a lag time between a time when the oxygen and the hydrogen are injected and the time when the oxygen and the hydrogen reach the gaseous waste disposal system, respectively; and controlling injection timings from the hydrogen injection and the oxygen injection in response to the lag time.

In both the aspects, in preferred embodiments, a quantity of the hydrogen to be injected in a steady state is controlled such that a volume ratio of hydrogen is less than twice a quantity of the oxygen to be injected. A volume of the hydrogen to be injected is controlled such that the volume of the hydrogen is less than twice the sum of a quantity of the oxygen contained in a leaked air of the gaseous waste disposal system and a quantity of the oxygen to be injected. An injection of the oxygen into the gaseous waste disposal system is controlled in a quantity to be less than that of an allowance flow rate, an injection of the hydrogen is controlled in a quantity to be twice the quantity of the injected oxygen, then a lag time that elapses between a moment of injecting the hydrogen and a time when a flow rate of an exhaust gas of the gaseous waste disposal system is lowered to a quantity before injecting the oxygen is stored, the quantity of the injected hydrogen is increased to a rated flow rate, and the quantity of the oxygen to be injected is controlled in a quantity to be a half of the hydrogen injected after the lag time into the gaseous waste disposal system.

According to the structures and the characters of the present invention described above, by controlling the injection quantities from the hydrogen injection means and the oxygen injection means based on the measurement results of the densitometer and the flowmeter, a small quantity of the oxygen is firstly injected into the gaseous waste disposal system so as to prevent the hydrogen from exceeding 4% in volume ratio, and thereafter, the hydrogen twice in quantity of oxygen is injected, whereby all the quantities of the hydrogen and the oxygen can be recombined to become water in the gaseous waste disposal system.

Furthermore, by measuring a period of time that elapses between the time when the injection of the hydrogen is started and the time when the flow rate of the gaseous waste disposal system is returned to that before injecting the oxygen or before injecting the hydrogen, there is obtained a lag time that elapses between the time when the injection of the hydrogen is started and the time when hydrogen reaches the gaseous waste disposal system. On the basis of this lag time, the quantities of the hydrogen and the oxygen to be injected are increased or decreased so that the flow rate in the gaseous waste disposal system does not exceed the allowable value and that the hydrogen does not exceed 4%, in volume ratio thereby continuously injecting necessary quantity of the hydrogen in a short period of time.

The nature and further features of the present invention will be made more clear through the following descriptions with reference to the accompanying drawings.

DESCRIPTION OF THE PREFERRED EMBODIMENT

A preferred embodiment of the present invention will be described hereunder with reference to the drawings.

Figure 1:
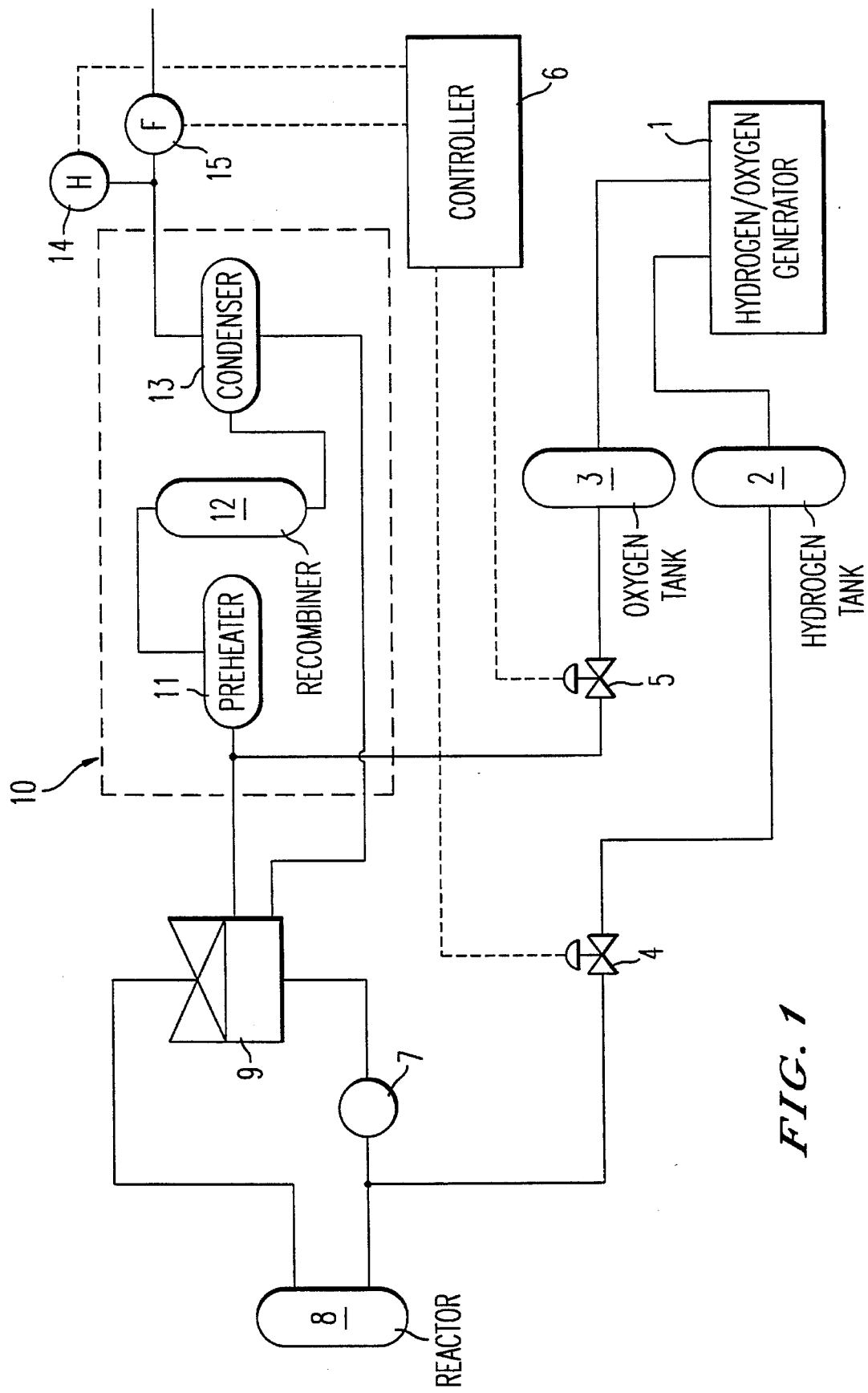
FIG. 1 is a schematic diagram of a gas injection system of a nuclear power plant according to one embodiment of the present invention.
Figure 2:
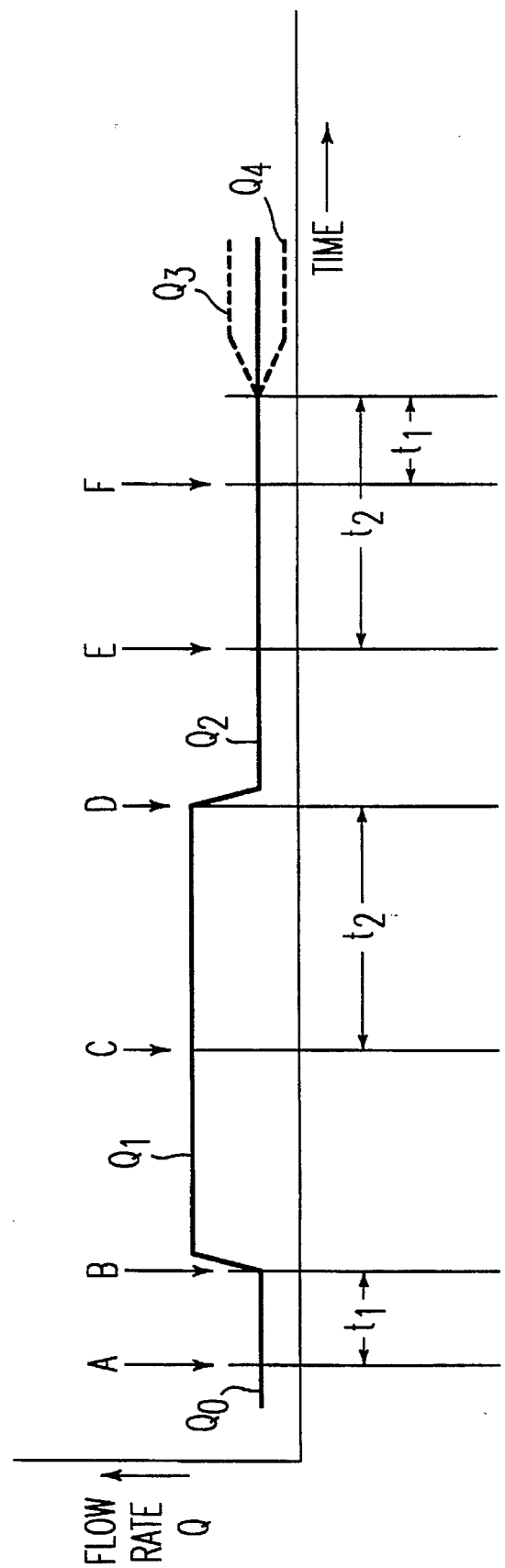
FIG. 2 is a timing chart representing changes of a flow rate in a gaseous waste disposal system when the gas injection system of FIG. 1 is operated.

FIGS. 1 and 2 show an embodiment of a gas injection system of a nuclear power plant according to the present invention. Referring to FIG. 1, a hydrogen-oxygen generator 1 comprises an electrolysis unit of water, and hydrogen and oxygen are separated therefrom and stored in a hydrogen tank 2 as a hydrogen injection means and in a oxygen tank 3 as a oxygen injection means, respectively.

A hydrogen injection valve 4 is connected to the hydrogen tank 2 and an opening degree of the hydrogen injection valve 4 is controlled in response to control signals from a controller 6 as a storage (memory)-control means. When the hydrogen injection valve 4 is opened, the hydrogen stored in the hydrogen tank 2 is injected into a downstream side of a condensate demineralizer 7. The injected hydrogen is supplied to a reactor 8 such as BWR to reduce the oxygen concentration in the reactor 8 and, thereafter, treated in a gaseous waste disposal system 10 by way of a main condenser 9 together with main steam.

On the other hand, in order to treat the hydrogen in the gaseous waste disposal system 10, an oxygen injection valve 5 is connected to the oxygen tank 3 and an opening degree of the oxygen injection valve 5 is controlled in response to control signals form the controller 6. When the oxygen injection valve 5 is opened, the oxygen stored in the oxygen tank 3 is injected into an upstream side of a preheater 11 in the gaseous waste disposal system 10. A recombiner 12 is connected to the preheater 11, in which the oxygen is recombined with hydrogen to become water, which is then recovered to a condenser 13.

A hydrogen concentration at an exit of the recombiner 12 is always monitored by a hydrogen densitometer 14 provided at the downstream side of the condenser 13 so as to monitor a balance of the quantities of the hydrogen and the oxygen. A quantity of an exhaust gas at a downstream side of the recombiner 12 is monitored by a flowmeter provided at the downstream side of the condenser 13, and the injection quantities of the hydrogen and the oxygen are controlled by controlling the degrees of openings of the hydrogen injection valve 4 and the oxygen injection valve 5 through the operation of the controller 6 in response to the flow signals.

An operation of the gas injection apparatus of the present embodiment will be described.

Firstly, it is ensured by the flowmeter 15 that a flow rate of the gaseous waste disposal system 10 under a steady operating condition has an allowance against an allowance flow rate, and an injection of a small quantity of oxygen into an inlet of the preheater is then started. This injection quantity is set so that the flow rate of the exhaust gas in the gaseous waste disposal system 10 after the injection of the oxygen is allowable flow rate or less.

Since the oxygen tank 3 is apart from the gaseous waste disposal system 10, a lag time to reach the gaseous waste disposal system is measured by a timer of the controller 6. The lag time is a period of time that elapses between the time when the injection of the oxygen is started and the time when the flow rate of the exhaust gas of the gaseous waste disposal system 10 begins to increase, and is shown as t1 in FIG. 2. The flow rate of the exhaust gas of the gaseous waste disposal system 10 under this condition corresponds to the quantity of the injected oxygen in an increased quantity.

Next, the hydrogen of the quantity twice the quantity of the previously injected oxygen is injected from the hydrogen tank 2. The injected hydrogen reaches the gaseous waste disposal system 10 by way of the reactor 8, the main steam pipe and the main condenser 9 with the lag time. Then, the hydrogen is recombined with the oxygen in the recombiner 12 with a ratio of 2:1, and all the quantity of the injected hydrogen and oxygen become water. Thus, the flow rate of the exhaust gas in the gaseous disposal system 10 is returned to that before the injection of the hydrogen and the oxygen.

Accordingly, by measuring a period of time that elapses between the moment when an injection of hydrogen is started and the time when the flow rate of the exhaust gas begins to lower, a lag time that elapses before the hydrogen reaches the gaseous waste disposal system 10 will be obtained. This time is shown as t2 in FIG. 2.

Thereafter, the injection rate of the hydrogen is increased to an initially required quantity. Then, the oxygen is increased to an initially required quantity after (t2–t1) hours. Thus, the hydrogen and oxygen reach the gaseous waste disposal system 10 at the same time in the volume ratio of 2:1. Accordingly, since all the quantities of the injected hydrogen and oxygen are recombined to become water, the flow rate of the exhaust gas can be maintained in the same amount as that before the injection of the hydrogen and the oxygen.

Furthermore, when the flow rate of the exhaust gas after the injection of the hydrogen and the oxygen is increased as Q3 shown in FIG. 2, the injection quantity of the hydrogen or oxygen is larger than a prescribed value, or the quantities of the hydrogen and the oxygen are in an unbalanced condition.

This phenomenon occurs when the quantity of the injected hydrogen exceeds twice the total of the injected oxygen and the quantity of the oxygen in the leaked air, or when the quantity of the injected oxygen exceeds a half quantity of the injected hydrogen.

In the former case, an excessive quantity of the hydrogen is injected, there is a danger of occurrence of hydrogen burning, providing an undesirable phenomenon. In this case, since the hydrogen concentration is detected by the hydrogen densitometer 14, an alarm is given when the hydrogen concentration exceeds the prescribed concentration.

When the hydrogen concentration exceeds the prescribed value, the control signals are output from the controller 6 to the hydrogen injection valve 4 in response to the signal of the hydrogen concentration and the signal of the excessive flow rate from the flowmeter 15, and the degree of opening of the hydrogen injection valve 4 is tightened in order to reduce the quantity of the injected hydrogen. Otherwise, the degree of opening of the oxygen injection valve 5 is widen in response to the same control signals as those described above to increase the quantity of the injected oxygen, thereby recovering the flow rate in the gaseous waste disposal system 10 to the normal value.

In the latter case, that is, when the quantity of the oxygen is excessive, there is no danger. However, in order to recover the flow rate in the gaseous waste disposal system 10 to the steady value, the signals are output from the controller 6 to the oxygen injection valve 5 in response to the signal from the hydrogen densitometer 14 announcing that the hydrogen concentration does not exceed the prescribed value and the signal from the flowmeter 15, and the degree of opening of the oxygen injection valve 5 is tightened to reduce the quantity of the injected oxygen.

When the flow rate of the exhaust gas after the injection of the hydrogen and the oxygen is decreased as Q4 shown in FIG. 2, the quantities of the hydrogen and the oxygen are in an unbalanced condition and the quantity of the hydrogen is larger than that of the oxygen. That is, this phenomenon occurs when the quantity of the injected hydrogen exceeds twice the injected oxygen to such a degree that the quantity of the injected hydrogen does not exceed twice the total of the quantity of the injected oxygen and the quantity of the oxygen in the leaked air.

In this case, since there are large quantity of the hydrogen, the oxygen in the leaked air is recombined with hydrogen, thereby reducing the flow rate in the gaseous waste disposal system 10. In order to eliminate such phenomenon, the quantity of the injected hydrogen may be reduced or the quantity of the injected oxygen may be increased.

In case of reducing the quantity of the injected hydrogen, the control signals are output from the controller 6 to the hydrogen injection valve 4 in response to the signal from the hydrogen densitometer 14 announcing that the hydrogen concentration does not exceed the prescribed value and the signal from the flowmeter 15 announcing that the flow rate is lower than the prescribed value, and the degree of opening of the hydrogen injection valve 4 is tightened to reduce the quantity of the injected hydrogen. On the other hand, in case of increasing the quantity of the injected oxygen, the degree of opening of the oxygen injection valve 5 may be tightened in response to the similar control signals to increase the quantity of the injected oxygen.

According to the present embodiment, through the controlling of the injection quantities by the controller 6 based on the measurement results of the hydrogen densitometer 14 and the flowmeter 15, the oxygen of small quantity is firstly injected into the gaseous waste disposal system 10 so as to prevent the hydrogen from exceeding 4% in volume ratio, and thereafter, the hydrogen of a quantity twice oxygen is injected from the hydrogen tank 2, whereby all the quantities of the hydrogen and the oxygen may be recombined to become water in the gaseous waste disposal system 10

Furthermore, by measuring a period of time that elapses between the time when injection of hydrogen is started and the time when the flow rate in the gaseous waste disposal system 10 is returned to that before injecting the oxygen or before injecting the hydrogen, there is obtained a lag time that elapses between the time when injection of hydrogen is started and the time when hydrogen reaches the gaseous waste disposal system 10. 0n the basis of this lag time, the quantities of the hydrogen and the oxygen to be injected may be increased or decreased so that the flow rate in the gaseous waste disposal system 10 does not exceed the allowable value and that hydrogen does not exceed 4% in quantity, thereby continuously injecting required quantity of the hydrogen in a short period of time.

The gas injection method according to the present invention described above will be understood more easily with reference to FIG. 2, in which the axis of abscissa represents an elapsing time and the axis of ordinate represents the flow rate Q (Q1 to Q4).

Referring to the time chart of FIG. 2, a point A is a starting time of injection of a small quantity of oxygen, a point B is a time when the injected oxygen reaches the gaseous waste disposal system, a point C is a starting time of injection of a small quantity of hydrogen, a point D is a time when the injected hydrogen reaches the gaseous waste disposal system, a point E is a time at which the injection of a prescribed quantity of hydrogen starts, and a point F is a time at which the injection of the prescribed quantity of the oxygen starts.

As described above, according to a gas injection system of a nuclear power plant and the gas injection method therefor of the present invention, the injection quantities from the hydrogen injection means and the oxygen injection means are controlled on the basis of the measurement results of the densitometer and the flowmeter, the lag time that elapses between the time when the oxygen or hydrogen is injected and the time when the oxygen or hydrogen reaches the gaseous waste disposal system, and the injection timings from the hydrogen injection means and the oxygen injection means are controlled on the basis of the lag times, whereby the balance of the quantities of the hydrogen and the oxygen to be injected can be always and easily controlled to the ratio of 2:1.

Furthermore, since the quantity of the injected hydrogen is prevented from being excessive, a danger of occurrence of hydrogen burning may be avoided. Further, the quantity of the injected hydrogen and the quantity of the injected oxygen can be controlled so as not to exceed the allowable flow rate of the gaseous waste disposal system, thereby enhancing the safe operation of the gas injection system of the nuclear power plant.

What is claimed is:

1. A gas injection system of a nuclear power plant including a reactor and a gaseous waste disposal system, comprising:

a hydrogen injection means for injecting hydrogen into a reactor of a nuclear power plant;

an oxygen injection means for injecting oxygen into a gaseous waste disposal system in which the oxygen is recombined with the hydrogen passed by way of the reactor;

means for measuring a balance of concentration between the hydrogen and the oxygen in said gaseous waste disposal system;

means for measuring a flow rate of an exhaust gas of said gaseous waste disposal system; and a control means for controlling injection quantities of the hydrogen and the oxygen from said hydrogen injection means and said oxygen injection means in accordance with the measurement results of said concentration balance measuring means and said flow rate measuring means, for storing a lag time between a time when the oxygen and the hydrogen are injected and the time when the oxygen and the hydrogen reach the gaseous waste disposal system, respectively, and for controlling injection timings from said hydrogen injection means and said oxygen injection means in response to the lag time.

2. A gas injection system according to claim 1, wherein said control means controls a quantity of the hydrogen to be injected in a steady state such that a volume ratio of hydrogen is less than twice a quantity of the oxygen to be injected.

3. A gas injection system according to claim 1, wherein said control means controls a volume of the hydrogen to be injected such that the volume of the hydrogen is less than twice the sum of a quantity of the oxygen contained in a leaked air of the gaseous waste disposal system and a quantity of the oxygen to be injected.

4. A gas injection system according to claim 1, wherein said control means operates to control an injection of the oxygen into the gaseous waste disposal system in an quantity less than that of an allowance flow rate, to control an injection of the hydrogen in a quantity twice the quantity of the injected oxygen, then to store a lag time that elapses between a moment of injecting the hydrogen and a time when a flow rate of an exhaust gas of the gaseous waste disposal system is lowered to a quantity before injecting the oxygen, to increase the quantity of the injected hydrogen to a rated flow rate, and to control the quantity of the oxygen to be injected in a quantity a half of the hydrogen injected after said lag time into the gaseous waste disposal system.

5. A gas injection system according to claim 1, wherein said hydrogen injection means and said oxygen injection means are connected to a common electrolysis unit of water for generating hydrogen and oxygen.

6. A gas injection system according to claim 1, wherein the hydrogen and the oxygen are recombined in a recombiner disposed in the reactor and said concentration balance measuring means is a densitometer which monitors a hydrogen concentration at an outlet portion of the recombiner and hence to monitor the balance between the quantities of the hydrogen and the oxygen.

7. A gas injection system according to claim 1, wherein the recombiner is connected at its downstream side to a condenser and said exhaust gas flow rate measuring means is disposed at the downstream side of the condenser.

8. A gas injection method for a nuclear power plant including a reactor and a gaseous waste disposal system, comprising the steps of:

injecting hydrogen into a reactor of a nuclear power plant;

injecting oxygen into a gaseous waste disposal system in which the oxygen is recombined with the hydrogen passed by way of the reactor;

measuring a balance of concentration between the hydrogen and the oxygen in said gaseous waste disposal system;

measuring a flow rate of an exhaust gas of said gaseous waste disposal system;

controlling injection quantities of the injected hydrogen and the oxygen in accordance with the results of the concentration balance measurement and the flow rate measurement;

storing a lag time between a time when the oxygen and the hydrogen are injected and the time when the oxygen and the hydrogen reach the gaseous waste disposal system, respectively; and controlling an injection timing from the hydrogen injection and the oxygen injection in response to the lag time.

9. A method according to claim 8, wherein a quantity of the hydrogen to be injected in a steady state is controlled such that a volume ratio of hydrogen is less than twice a quantity of the oxygen to be injected.

10. A method according to claim 8, wherein a volume of the hydrogen to be injected is controlled such that the volume of the hydrogen is less than twice the sum of a quantity of the oxygen contained in a leaked air of the gaseous waste disposal system and a quantity of the oxygen to be injected.

11. A method according to claim 8, wherein an injection of the oxygen into the gaseous waste disposal system is controlled in a quantity to be less than that of an allowance flow rate, an injection of the hydrogen is controlled in a quantity to be twice the quantity of the injected oxygen, then a lag time that elapses between a moment of injecting the hydrogen and a time when a flow rate of an exhaust gas of the gaseous waste disposal system is lowered to a quantity before injecting the oxygen is stored, the quantity of the injected hydrogen is increased to a rated flow rate, and the quantity of the oxygen to be injected is controlled in a quantity to be a half of the hydrogen injected after the lag time into the gaseous waste disposal system.

* * * * *